United States Patent
Gottwald et al.

(10) Patent No.: US 7,268,722 B2
(45) Date of Patent: Sep. 11, 2007

(54) ANGULAR RESOLUTION ANTENNA SYSTEM

(75) Inventors: Frank Gottwald, Weissach (DE); Michael Schlick, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 77 days.

(21) Appl. No.: 10/527,150

(22) PCT Filed: Oct. 22, 2003

(86) PCT No.: PCT/DE03/03514

§ 371 (c)(1), (2), (4) Date: Mar. 9, 2005

(87) PCT Pub. No.: WO2004/061475

PCT Pub. Date: Jul. 22, 2004

(65) Prior Publication Data

US 2006/0164294 A1    Jul. 27, 2006

(30) Foreign Application Priority Data

Dec. 24, 2002   (DE) ................................ 102 61 027

(51) Int. Cl.
    *G01S 13/42* (2006.01)
(52) U.S. Cl. .................... 342/70; 342/107; 342/109
(58) Field of Classification Search ............ 342/70–72, 342/79, 127, 133–135, 139, 146, 147, 154, 342/155, 157, 158
    See application file for complete search history.

(56) References Cited

U.S. PATENT DOCUMENTS

| 5,008,678 A * | 4/1991 | Herman ....................... 342/158 |
| 6,094,160 A * | 7/2000 | Lajiness ....................... 342/70 |
| 6,137,434 A | 10/2000 | Tohya et al. .................. 342/70 |
| 6,433,741 B2 * | 8/2002 | Tanizaki et al. ..... 343/700 MS |
| 6,750,810 B2 * | 6/2004 | Shinoda et al. ............. 342/149 |
| 2002/0067314 A1 * | 6/2002 | Takimoto et al. ........... 343/713 |
| 2004/0036645 A1 * | 2/2004 | Fujieda et al. ................ 342/70 |
| 2004/0119633 A1 * | 6/2004 | Oswald et al. ................ 342/70 |
| 2006/0164294 A1 * | 7/2006 | Gottwald et al. ............. 342/70 |

FOREIGN PATENT DOCUMENTS

| DE | 44 12 770 | 10/1995 |
| DE | 100 56 002 | 5/2002 |
| GB | 2099256 A * | 12/1982 |
| JP | 60057281 A * | 4/1985 |
| JP | 62135785 A * | 6/1987 |
| JP | 7 167951 | 7/1995 |
| WO | WO99/42856 | 8/1999 |
| WO | WO 02/15334 | 2/2002 |

OTHER PUBLICATIONS

"Multi-beam automotive radar front end using non-contact cylindrical NRD switch", Tanizaki, T.; Nishida, H.; Nishiyama, T.; Yamada, H.; Sakamoto, K.; Ishikawa, Y. Microwave Symposium Digest, 1998 IEEE MTT-S Int'l vol. 2, Jun. 7-12, 1998 Ps:521-524.*
Patent Abstracts of Japan, vol. 1995, No. 10, Nov. 30, 1995.

* cited by examiner

*Primary Examiner*—John B Sotomayor
(74) *Attorney, Agent, or Firm*—Kenyon & Kenyon LLP

(57) ABSTRACT

For an angle-resolving antenna system, only two radar sensors are provided including separate transmitting and receiving antennas. The receiving antennas of the two radar sensors are switchable with reference to their main beam direction as well as to their beam width.

5 Claims, 4 Drawing Sheets

VEHICLE FRONT

VEHICLE FRONT

VEHICLE FRONT

VEHICLE FRONT

ANGULAR RESOLUTION ANTENNA SYSTEM

FIELD OF THE INVENTION

The present invention relates to an angle-resolving antenna system.

BACKGROUND INFORMATION

Pulse radar systems may be used for the determination of the speed and distance of objects in street traffic, as in, for example, International Published Patent Application No. 99/42856.

German Published Patent Application No. 44 12 770 discusses that overlapping antenna lobes may be produced for a motor vehicle distance-warning radar in which the beam lobes may also be swiveled. Either an exciter system is used there as the transmitting and receiving antenna, or a separate transmitting and receiving antenna is provided.

International Published Patent Application No. 02/15334 discusses a multi-beam antenna array including a beam-shaping network and a beam-combining network. Measures are taken there to have the transmitting and receiving lobes point in exactly the same direction.

SUMMARY OF THE INVENTION

The present invention provides for two radar sensors for the determination of distance and angular deviation each including a separate transmitting and receiving antenna, receiving antennas for the two radar sensors switchable with reference to their main beam direction as well as to their beam width, and an evaluation arrangement for obtaining the angular deviation from the receiving signals of the two radar sensors in unlike switching states of their receiving antennas, may allow the number of radar sensors, in particular for the determination of angular deviation, to be reduced. Two different receiving antenna characteristics give information concerning the angular deviation of a target.

In addition to the evaluation of angular deviation using only two radar sensors, an increase in range is obtained. Switching, i.e., free selection of antenna characteristics with reference to their main beam direction and beam width, results in great flexibility for a variety of applications, e.g., ACC, TWD, PP, in the close and far range. When the additional antenna exciter arrays are switched off, the antenna system is still capable of delivering its usual performance.

DETAILED DESCRIPTION

Figure 1:
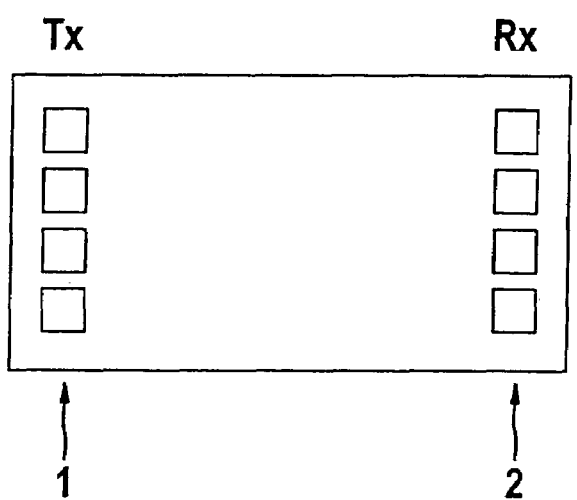
FIG. 1 shows a radar sensor including a transmitting and a receiving antenna array in each instance.

FIG. 1 shows an antenna arrangement of another system including a column 1 of four patch exciters for transmitting and a column 2, separate therefrom, of four patch exciters for receiving. A single patch exciter has a beam angle of about 90°.

Figure 2:
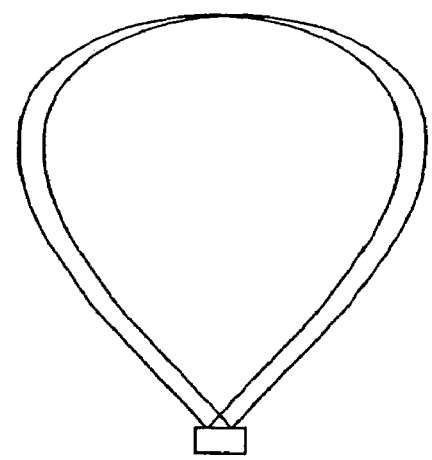
FIG. 2 shows an antenna characteristic in the azimuth direction for transmitting and receiving antenna.

If, as here, a plurality of patches, for example four patches, are located in a column, the vertical antenna beam angle (elevation) is reduced by the number of antenna elements. With the four patch exciters of FIG. 1, a vertical beam angle of 30° is obtained. In the horizontal direction (the azimuth), nothing is altered with respect to a single exciter, i.e., the beam angle is 90°. The antenna characteristics associated with FIG. 1 are shown in FIG. 2. The antenna characteristics for transmitting and receiving in the azimuth are practically the same.

Figure 9:
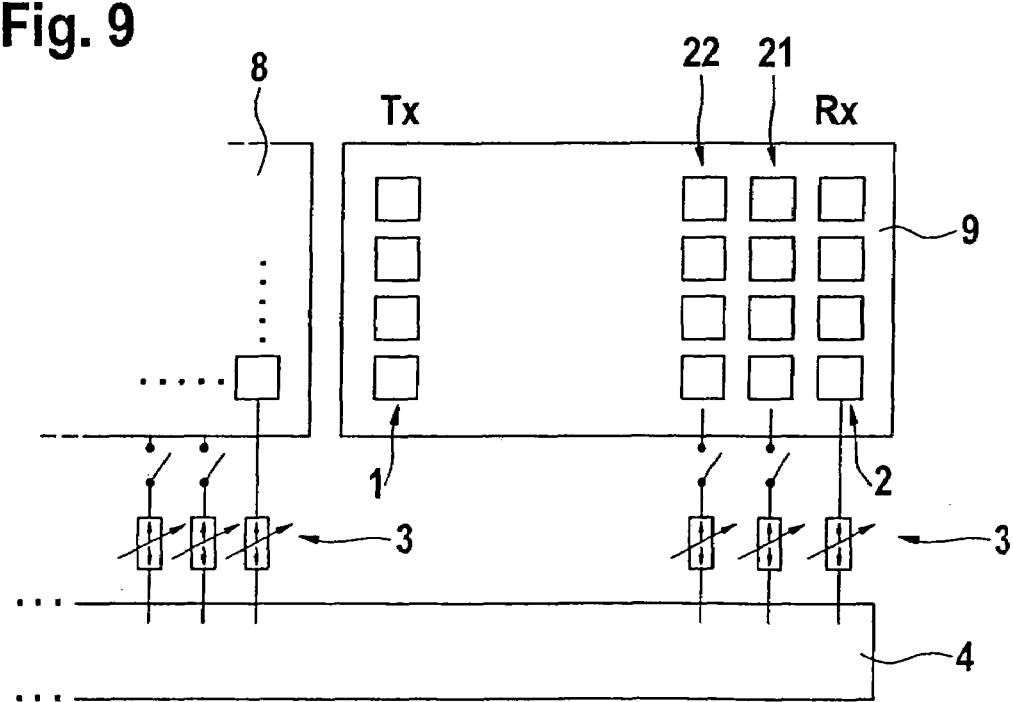
FIG. 9 shows the configuration of a patch antenna array and the signal evaluation.

Now, if one or more columns are combined into one receiving-antenna array, beam shaping may also be executed in the azimuth. The antenna diagram may be swiveled when the individual columns are in addition controlled separately by signals displaceable in phase. For this purpose, phase shifters 3 with unlike time lags may be provided for each column (FIG. 9, whose output signals are processed together in evaluation unit 4, in order to determine the angular deviation from the receiving signals of the two radar sensors in unlike switching states). Switch-off or switch-on of antenna columns may be varied in the antenna diagram, i.e., the antenna characteristic. Two columns that are capable of being switched on and include four patch exciters each are shown in FIG. 9.

Figure 3:
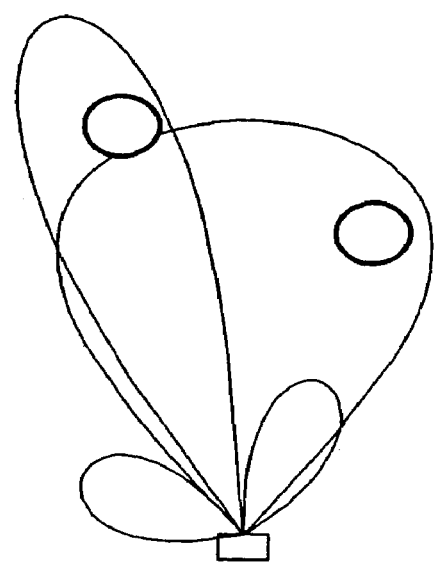
FIG. 3 shows a variety of target scenarios with switchable antenna characteristic of a receiving antenna.

Switching the receiving antenna characteristics may allow the number of radar sensors to be reduced. Two different receiving antenna characteristics permit information concerning the angular deviation of a target to be obtained. Various target scenarios are shown in FIG. 3. Thus, in addition to distance information, the angular deviation is obtained. The switchable antenna diagrams of the receiving antennas for separation of the two targets are shown in FIG. 3.

Figure 4:
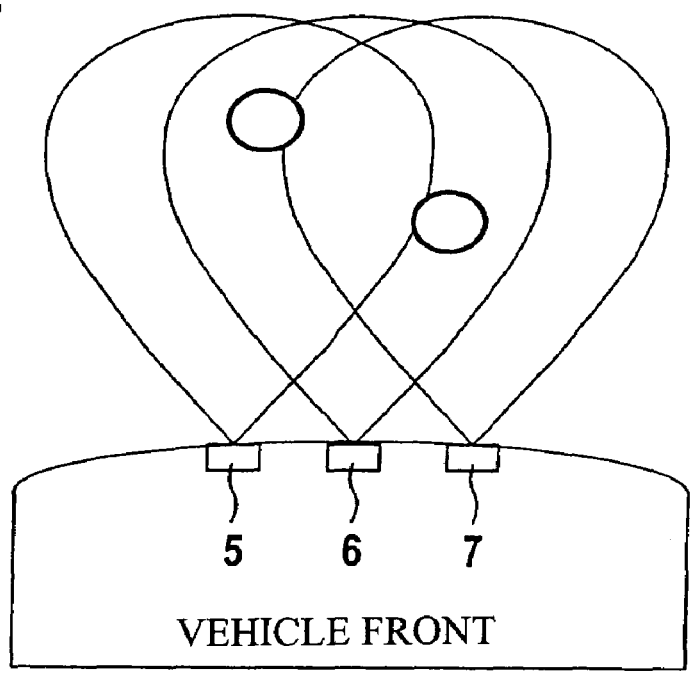
FIG. 4 shows a target situation with antenna characteristics of three radar sensors without switching of the antenna characteristics.

FIG. 4 shows the ACC-stop-and-go situation using three radar sensors without antenna switching. At least three radar sensors 5, 6, and 7 are required in order to be able to react specifically to two targets using triangulation.

Figure 5:
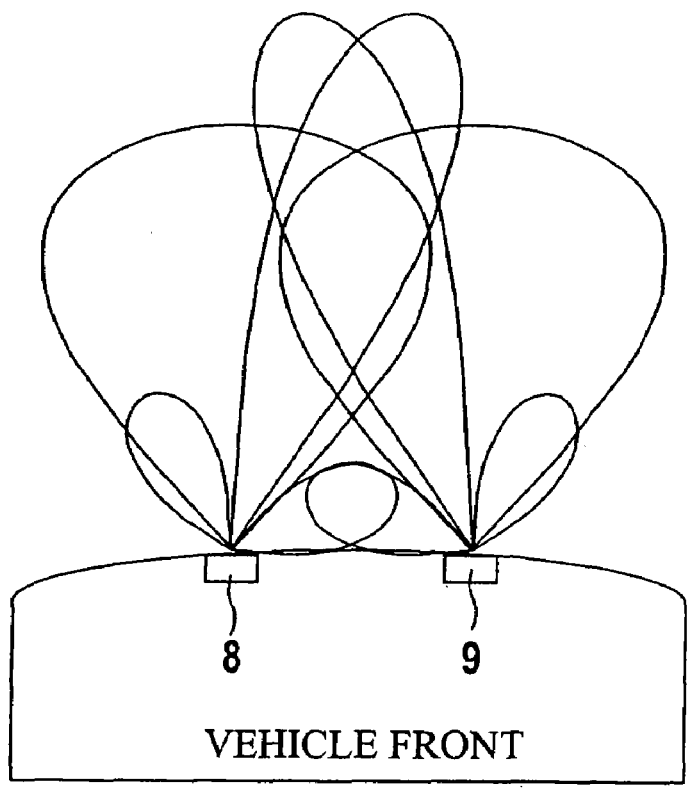
FIG. 5 shows the target situation of FIG. 4 using two radar sensors with switching of the antenna characteristics.

FIG. 5 shows the same situation, controlled according to the present invention by two radar sensors 8 and 9, specifically by configuring the receiving antennas of radar sensors 8 and 9 as switchable with reference to their main beam direction as well as to their beam width, in particular by switching antenna columns 2, 21, 22 on and off (FIG. 9) and corresponding phase control. The two narrow lobes, i.e., the antenna characteristics having a narrow beam width, are swiveled out of the sensor axis, i.e., toward the midperpendicular of the two radar sensors, in the direction of the center of the vehicle. An increase in range directly in front of the vehicle is thereby obtained.

The arrangement in FIG. 5 may provide for:

Rough angular resolution of a single sensor,

Reduction in the number of radar sensors,

Increase in range,

Switching, i.e., free selection of the antenna characteristic, results in greater flexibility (ACC, TWD, PP).

The antenna columns are switched on or off depending on the application. When additional columns are switched off, the radar sensors continue to be capable of delivering the same performance, as may be seen in FIG. 2. There a variation of the known amplitude monopole method is shown with antenna lobes that are not swiveled.

Figure 6:
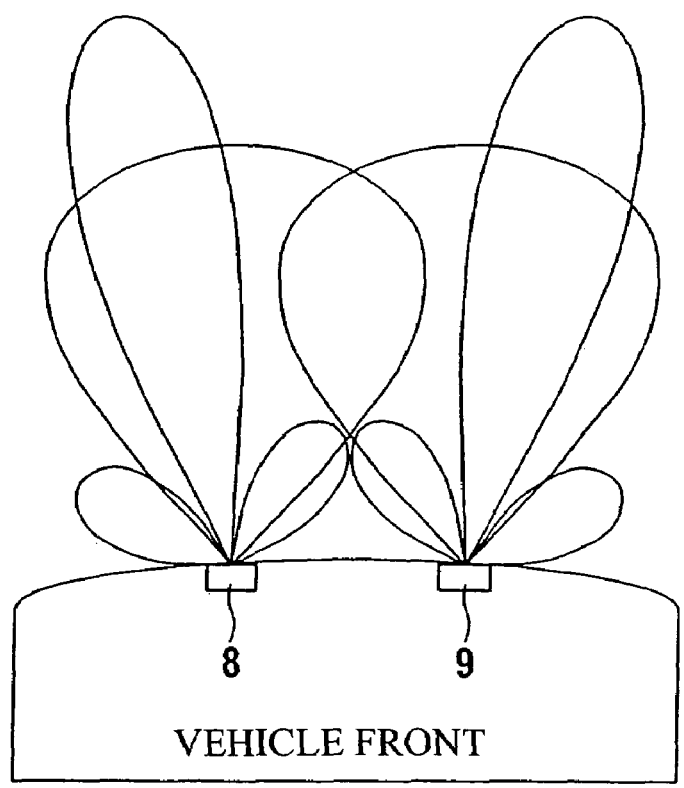
FIG. 6 shows antenna characteristics with two switchable radar sensors and antenna characteristics pointing outward with reference to the receiving antenna having a narrow beam width.
Figure 7:
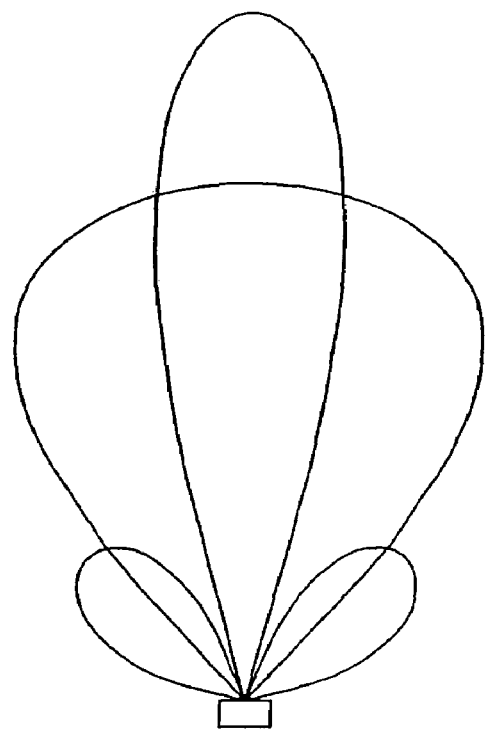
FIG. 7 shows a radar sensor with alignment of the antenna characteristics having a narrow beam width in the direction of the sensor axis.
Figure 8:
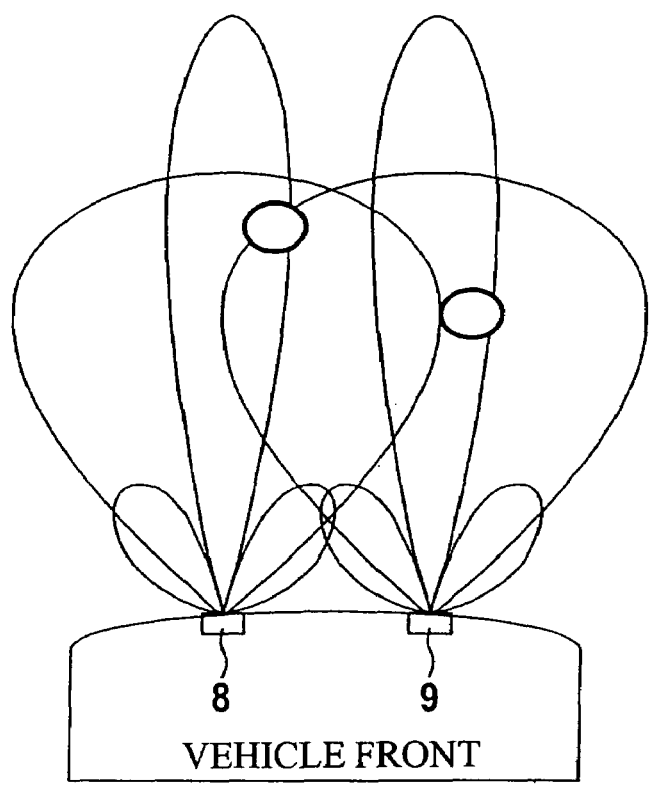
FIG. 8 shows antenna characteristics of two arrays of patch antennas.

The case with lobes turned outward with reference to the narrow beam widths is shown in FIG. 6. This arrangement permits precise detection at the edges of the vehicle path in forward as well as in reverse direction. It is of course alternatively possible to align the narrow antenna lobes in the direction of the sensor axis (FIG. 7). The same feature as described above is obtained by skillful selection methods. Two targets may be specifically allocated in combination with the second radar sensor (FIG. 8). The increased gain of the antenna increases the range of the radar sensor. In addition, switching of the antenna characteristics (lobes) permits optimal use of the radar sensor in the close range and in the far range. The antenna characteristic remains constant, so that the transmitting power need not be switched. This may be for approval reasons.

As FIG. 9 shows, the receiving antenna includes an array of individual patches. Triggering of the antenna columns gives information concerning the mode of operation. Either the signal phases are switched and a swivelable antenna lobe is present, or the columns are switched on and a distinct change in the beam angle of the receiving antenna is present.

The antenna system according to the present invention may be suitable for angular resolution in pulse radar applications of automotive technology, but alternatively may be used for other applications.

What is claimed is:

1. An angle-resolving antenna system for pulse radar applications in automotive technology, comprising:

two radar sensors for determination of distance information and angular deviation, each of the two radar sensors including a separate transmitting antenna and receiving antenna;

an evaluation unit for obtaining the angular deviation from receiving signals of the two radar sensors in unlike switching states; and at least one column of antenna exciters that is capable of being switched on and off for switching the beam width;

wherein receiving antennas of the two radar sensors are configured to be switchable with regard to main beam direction and beam width.

2. The angle-resolving antenna system of claim 1, wherein a phase control of at least two columns of antenna exciters for switching the main beam direction.

3. The angle-resolving antenna system of claim 1, wherein the receiving antennas of the two radar sensors with a narrow beam width with reference to the main beam direction are directed outward away from a midperpendicular of the two radar sensors in order to obtain precise detection at edges of a vehicle path in at least one a forward direction and a reverse direction.

4. The angle-resolving antenna system of claim 1, wherein the receiving antennas of the two radar sensors with a narrow beam width with reference to the main beam direction are inclined toward a midperpendicular of the two radar sensors in order to obtain an increased range in a driving direction.

5. An angle-resolving antenna system for pulse radar applications in automotive technology, comprising:

two radar sensors for determination of distance information and angular deviation, each of the two radar sensors including a separate transmitting antenna and receiving antenna;

an evaluation unit for obtaining the angular deviation from receiving signals of the two radar sensors in unlike switching states; and plurality of receiving antenna exciters columns that are combined into one antenna array in order to achieve beam shaping in an azimuth direction;

wherein receiving antennas of the two radar sensors are configured to be switchable with regard to main beam direction and beam width.

* * * * *